(12) United States Patent
Ishida et al.

(10) Patent No.: US 8,398,350 B2
(45) Date of Patent: Mar. 19, 2013

(54) BOLT

(75) Inventors: Rikiya Ishida, Seki (JP); Manabu Naoi, Seki (JP)

(73) Assignee: Meira Corporation, Nagoya-Shi, Aichi (JP)

( * ) Notice: Subject to any disclaimer, the term of this patent is extended or adjusted under 35 U.S.C. 154(b) by 834 days.

(21) Appl. No.: 12/374,613

(22) PCT Filed: Jul. 18, 2007

(86) PCT No.: PCT/JP2007/064198
§ 371 (c)(1),
(2), (4) Date: Feb. 27, 2009

(87) PCT Pub. No.: WO2008/010523
PCT Pub. Date: Jan. 24, 2008

(65) Prior Publication Data
US 2010/0003106 A1    Jan. 7, 2010

(30) Foreign Application Priority Data
Jul. 21, 2006    (JP) .................................. 2006-199049

(51) Int. Cl.
*F16B 43/00* (2006.01)
*F16B 43/02* (2006.01)
(52) U.S. Cl. .................. 411/371.1; 411/369; 411/371.2; 411/377; 411/542; 411/903
(58) Field of Classification Search .................. 411/369, 411/371.1, 371.2, 542, 903, 377, 908
See application file for complete search history.

(56) References Cited

U.S. PATENT DOCUMENTS

| | | | | |
|---|---|---|---|---|
| 1,995,705 A | * | 3/1935 | Deniston, Jr. | 411/371.1 |
| 3,175,454 A | * | 3/1965 | Morse | 411/542 |
| 3,557,654 A | * | 1/1971 | Weidner, Jr. | 411/396 |
| 3,618,444 A | * | 11/1971 | Kay | 411/373 |

(Continued)

FOREIGN PATENT DOCUMENTS

| | | |
|---|---|---|
| JP | 48-13892 B1 | 5/1973 |
| JP | 10-184633 A | 7/1998 |

(Continued)

OTHER PUBLICATIONS

English Translation of the Written Opinion of the International Searching Authority.

(Continued)

*Primary Examiner* — Victor Batson
*Assistant Examiner* — Tyler Johnson
(74) *Attorney, Agent, or Firm* — Buchanan Ingersoll & Rooney (57) ABSTRACT

A bolt has a bolt body including a screw part, a head part formed at an upper end of the screw part, and a flange part formed at a lower end of the head part; and an unconductive ring-shaped resinous member covering a peripheral portion of the flange part. The flange part has a disk-shaped flange body portion; and a seat surface-forming portion having a seat surface which is pressed against a portion where the bolt is to be mounted. The ring-shaped member has an edge part which is located at a position nearer to a lower end of the screw part than the seat surface and outward from the flange body portion and an annular skirt part whose diameter gradually increases to the edge part. The annular skirt part is so formed that it deforms when the bolt is mounted on the portion where the bolt is to be mounted and forms an annular liquid-tight sealing portion for the portion where the bolt is to be mounted.

18 Claims, 6 Drawing Sheets

U.S. PATENT DOCUMENTS

| | | | | |
|---|---|---|---|---|
| 3,910,588 A * | 10/1975 | Austin | | 411/542 |
| 4,712,802 A * | 12/1987 | Hewison et al. | | 411/542 |
| 4,715,756 A * | 12/1987 | Danico et al. | | 411/369 |
| 4,749,321 A * | 6/1988 | Knohl et al. | | 411/371.1 |
| 4,875,818 A * | 10/1989 | Reinwall | | 411/369 |
| 4,934,856 A * | 6/1990 | Pauc | | 403/24 |
| 5,006,026 A * | 4/1991 | Estrada | | 411/369 |
| 5,407,313 A * | 4/1995 | Bruins et al. | | 411/544 |
| 5,906,463 A * | 5/1999 | Damm et al. | | 411/369 |
| 6,231,286 B1 * | 5/2001 | Bogatz et al. | | 411/371.1 |
| 6,244,807 B1 * | 6/2001 | Garcia | | 411/369 |

FOREIGN PATENT DOCUMENTS

JP      2005-291278 A    10/2005

OTHER PUBLICATIONS

International Search Report (PCT/ISA/210).

Japanese Official Action in corresponding Japanese Patent Application No. 2008-525884, mailed Jun. 5, 2012, with partial English translation.

* cited by examiner

BOLT

TECHNICAL FIELD

The present invention relates to a bolt effectively tightened to a portion required to have a sealing performance or effectively mounted on a molded product made of a metal such as magnesium, a magnesium alloy or the like which is liable to generate electrolytic corrosion.

BACKGROUND ART

As various members (for example, oil pan, engine head cover, AT mission case) of a car and the like, recently, molded products made of magnesium or a magnesium alloy are used. When a bolt made of a metal such as iron having a higher electric potential than the above-described members is used to bind the members tightly, an electrolytic corrosion action may occur at a portion where different kinds of metals contact each other and thus the members may corrode. Thus, a method of preventing the electrolytic corrosion by interposing an insulation washer between different kinds of metals to be fixedly bound to each other with a bolt and a method of treating the surface of the bolt or the like to prevent the occurrence of the electrolytic corrosion are conventionally used. In these methods, the washer and the bolt may rub each other, which may result in a decrease of an electrolytic corrosion effect or an electrolytic corrosion prevention film may separate from the surface of the bolt or the like, which may result in a decrease of the electrolytic corrosion effect. In addition, in the bolt (Japanese Patent Application Laid-Open No. 2005-291278: patent document 1), the surface of at least one of the bolt and the washer is treated to prevent it from electrolytically corroding, and the washer is fitted on the bolt body and fixed to the seat surface of the bolt with the washer in contact therewith. There is also proposed the bolt (Japanese Patent Application Laid-Open No. 10-184633: patent document 2) having the flange-provided head part and the molded winding drum part, made of synthetic resin, which is larger than the short flange portion in its diameter and has the short-leg cylindrical portion extended from the seat surface of the flange-provided head part at the lower end thereof. The molded winding drum part is integrated with the peripheral surface of the flange-provided head part.

Patent document 1: Japanese Patent Application Laid-Open No. 2005-291278
Patent document 2: Japanese Patent Application Laid-Open No. 10-184633

DISCLOSURE OF THE INVENTION

Problem to be Solved by the Invention

In the bolt of the patent document 1, supposing that the washer is surface-treated to prevent the occurrence of the electrolytic corrosion, the surface of the washer rub the portion where the bolt is to be mounted when the bolt is mounted thereon. Thereby the surface treated to prevent the occurrence of the electrolytic corrosion may be damaged. In surface-treating the bolt of the patent document 1 to prevent the occurrence of the electrolytic corrosion, the above-described problem does not occur. But the material for the washer to be used is limited to a kind that does not generate the electrolytic corrosion at a portion where the washer contacts the material forming the portion where the bolt is to be mounted. Thus it is necessary to select a material for the washer suitable for the material forming the portion where the bolt is to be mounted.

As another problem of the bolt of the patent document 1, there is a boundary between the bolt and the washer and between the washer the portion where the bolt is to be mounted. Thus it is difficult to secure liquid-tight sealing performance after the bolt is mounted on the portion where the bolt is to be mounted.

In the bolt of the patent document 2, the short-leg cylindrical portion extended from the seat surface of the flange-provided head part is disposed inside the lower portion of the molded winding drum part. When the bolt is tightened, the short-leg cylindrical portion is crushed, thus preventing a steel plate from corroding in spite of the penetration of rainwater. But there is a possibility that the crushing of the short-leg cylindrical portion causes a gap to be generated between the seat surface of the bolt and the mounting plate. In this case, the axial force of the bolt is held at the lower surface of the molded winding drum part. Therefore the axial force thereof cannot be sufficiently transmitted. Further the short-leg cylindrical portion is crushed inside the lower portion of the main part of the molded winding drum part. Thus the bolt has problems in that it is unsuitable for repeated use after the short-leg cylindrical portion is crushed.

An object of the present invention is to provide a bolt which is capable of holding an axial force through a seat surface thereof when the bolt is mounted on a metal molded product liable to cause electrolytic corrosion and securely preventing a liquid from penetrating into a portion of the metal molded product where the bolt is mounted and the metal molded product from causing electrolytic corrosion.

Means for Solving the Problem

A bolt which achieves the above-described object includes a bolt body having a screw part, a head part formed at an upper end of the screw part, and a flange part formed at a lower end of the head part; and an unconductive ring-shaped resinous member covering a peripheral portion of the flange part. The flange part has a disk-shaped flange body portion and a seat surface-forming portion having a seat surface which is extended toward the screw part from a lower surface of the flange body portion, has a smaller diameter than the flange body portion, and is pressed against a portion where the bolt is to be mounted. The ring-shaped resinous member has an edge part which is located at a position nearer to a lower end of the screw part than the seat surface and outward from the flange body portion and an annular skirt part whose diameter gradually increases to the edge part. The annular skirt part deforms when the bolt is mounted on the portion where the bolt is to be mounted and does not prevent the seat surface from being pressed against the portion where the bolt is to be mounted and forms an annular liquid-tight sealing portion for the portion where the bolt is to be mounted.

BEST MODE FOR CARRYING OUT THE INVENTION

The bolt of the present invention is described below by using embodiments with reference to the drawings.

Figure 1:
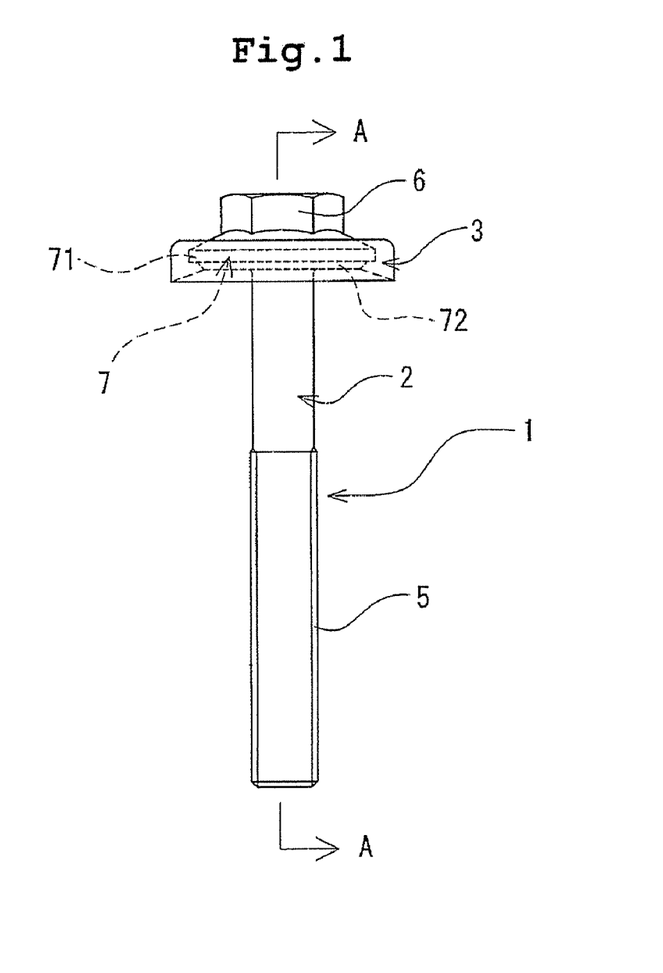
FIG. 1 is a front view of an embodiment of the bolt of the present invention.
Figure 2:
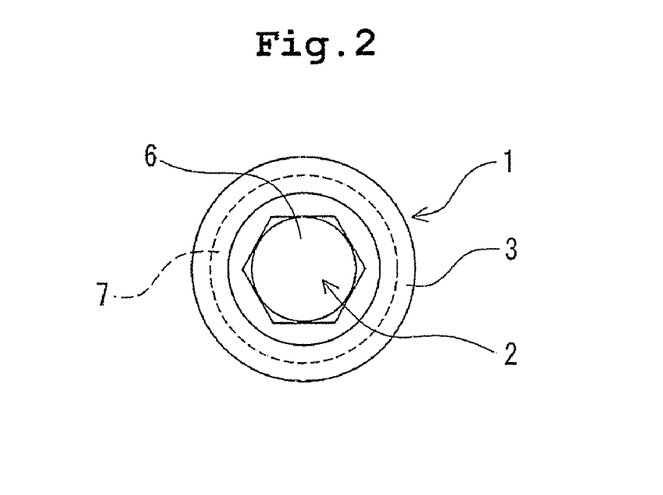
FIG. 2 is a plan view of the bolt shown in FIG. 1.
Figure 3:
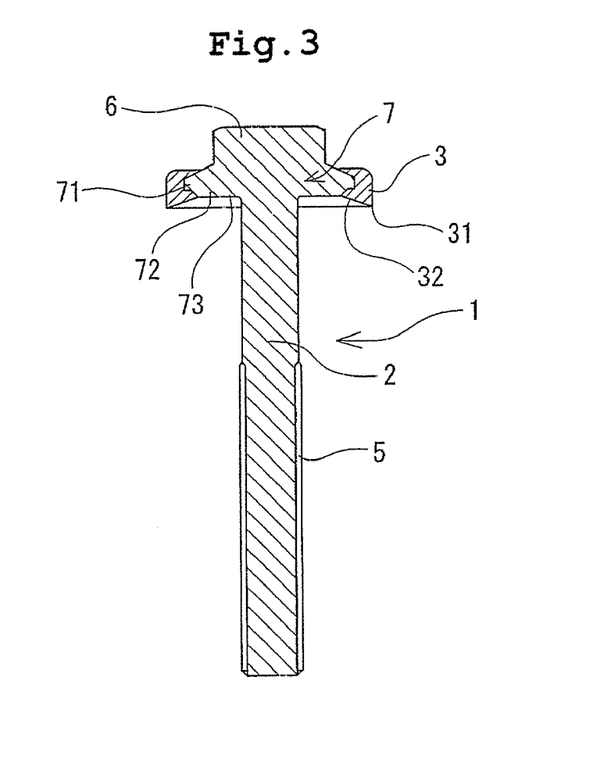
FIG. 3 is a sectional view taken along a line A-A of FIG. 1.
Figure 4:
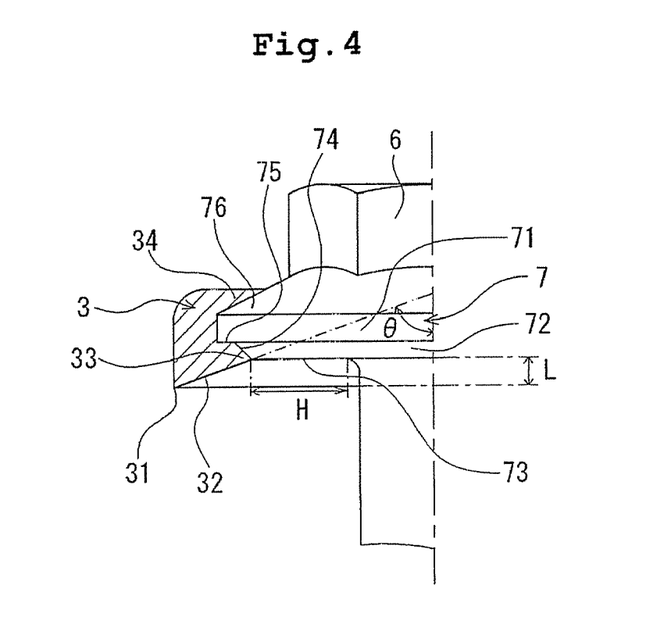
FIG. 4 is an explanatory view for explaining a bolt of an embodiment of the present invention.

FIG. 1 is a front view of an embodiment of the bolt of the present invention. FIG. 2 is a plan view of the bolt shown in FIG. 1. FIG. 3 is a sectional view taken along a line A-A of FIG. 1. FIG. 4 is an explanatory view for explaining a bolt of an embodiment of the present invention.

A bolt 1 of the present invention has a bolt body 2 including a screw part 5, a head part 6 formed at an upper end of the screw part 5, and a flange part 7 formed at a lower end of the head part 6; and an unconductive ring-shaped resinous member 3 covering a peripheral portion of the flange part 7. The flange part 7 has a disk-shaped flange body portion 71; and a seat surface-forming portion 72 having a seat surface 73 which is extended toward the screw part from a lower surface of the flange body portion 71, has a smaller diameter than the flange body portion 71, and is pressed against a portion where the bolt is to be mounted. The ring-shaped resinous member 3 has an edge part 31 which is located at a position nearer to a lower end of the screw part 5 than the seat surface 73 and outward from the flange body portion 71 and an annular skirt part 32 whose diameter gradually increases to the edge part 31. The annular skirt part 32 deforms when the bolt is mounted on the portion where the bolt is to be mounted and does not prevent the seat surface 73 from being pressed against the portion where the bolt is to be mounted and forms an annular liquid-tight sealing portion for the portion where the bolt is to be mounted. The bolt of the present invention is especially effective for preventing the occurrence of electrolytic corrosion.

As shown in FIG. 1 through FIG. 4, the bolt 1 of the present invention has the bolt body 2 and the unconductive ring-shaped resinous member 3 covering the peripheral portion of the flange part 7 of the bolt body 2.

The bolt body 2 is made of an iron-based steel material such as high tensile strength steel and stainless steel. As shown in FIG. 1 through FIG. 4, the bolt body 2 has the screw part 5, the head part 6 formed at the upper end of the screw part 5, and the flange part 7 formed at the lower end of the head part 6. A male screw is formed entirely on the screw part 5 or on an outer surface of a part of the screw part 5. In this embodiment, the head part 6 is formed at the upper end of the screw part 5. The diameter of the head part 6 is larger than an outer diameter of the screw part. The head part 6 is formed in the shape of a polygonal pillar so that an operation of rotating the head part 6 is performed with a wrench or the like.

The bolt 1 has the flange part 7 which is formed at the lower end of the head part 6 and has a larger outer diameter than the head part 6. As shown in FIG. 1 through FIG. 4, the flange part 7 has the disk-shaped flange body portion 71 and the seat surface-forming portion 72 having the seat surface 73 which is extended toward the screw part from the lower surface of the flange body portion 71, has a smaller diameter than the flange body portion 71, and is pressed against the portion where the bolt is to be mounted. The seat surface 73 is formed as a flat-surface portion and capable of holding a predetermined axial force when the bolt is mounted on the portion where the bolt is to be mounted.

In the bolt 1 of this embodiment, the seat surface-forming portion 72 has a smaller diameter than the flange body portion 71, and an annular side surface 74 of the seat surface-forming portion 72 forms a tapered portion whose diameter decreases to the seat surface 73. On the lower surface of the flange body portion 71, an annular flat surface 75 is formed between an upper peripheral edge of the annular side surface 74 and a peripheral edge of the lower surface of the flange body portion 71. The flange body portion 71 has the shape of a disk having substantially equal outer diameters. A tapered portion 76 whose diameter decreases toward the head part 6 is formed on an upper surface of the flange body portion 71.

The seat surface 73 is formed as a ring-shaped flat surface covering the upper end of the screw part. A preferable width H (FIG. 4) of the seat surface 73 is different according to the thickness of the bolt (in other words, the outer diameter of the screw part). The width H of the seat surface 73 for the outer diameter D of the screw part of the bolt is favorably 0.25 Dmm to 1.5 Dmm and especially favorably 0.4 Dmm to 1.3 Dmm. A preferable area of the seat surface is also different according to the thickness of the bolt (in other words, the outer diameter of the screw part). The area of the seat surface for the outer diameter D of the screw part of the bolt is favorably 5 Dmm$^2$ to 100 Dmm$^2$ and especially favorably 10 Dmm$^2$ to 80 Dmm$^2$. The annular flat surface 75 formed on the lower surface of the flange body portion is also formed as a ring-shaped flat surface. A width of the annular flat surface 75 is favorably 0.2 mm to 1.5 mm and especially favorably 0.5 mm to 1.0 mm. A preferable outer diameter of the flange body portion 71 is different according to the thickness of the bolt. The outer diameter of the flange body portion 71 for the outer diameter D of the screw part of the bolt is favorably 1.5 Dmm to 5.0 Dmm and especially favorably 1.8 Dmm to 4.2 Dmm.

As shown in FIGS. 1 through 4, the unconductive ring-shaped resinous member 3 covers the peripheral portion of the flange part 7 of the bolt body 2 and is unremovably fixed to the flange part 7 of the bolt body 2. As a material forming the ring-shaped resinous member 3, a material which is unconductive and has a certain degree of hardness and elastic deformability is used. It is desirable that the unconductive ring-shaped resinous member 3 is formed on the bolt body 2 by insert molding. Therefore as the material forming the ring-shaped resinous member 3, thermoplastic resins which can be insert-molded are used. The insert molding herein means that after the formed bolt body is inserted into a die, the ring-shaped resinous member is formed by injection of a melted resin.

The tensile break elongation of the material forming the ring-shaped resinous member 3 is favorably not less than 10%, more favorably not less than 15%, and most favorably not less than 20%.

As examples of materials forming the ring-shaped resinous member 3, it is possible to use polyacetal; polycarbonate; polyester (polyethylene terephthalate, polybutylene terephthalate); polyolefin (polyethylene, polypropylene, ethylene-propylene copolymer); polyamide (nylon 6, nylon 66); polysulfone; polyarylate; blend polymers or polymer alloys of these substances. The polyacetal and the polyamide are especially preferable.

As examples of materials forming the ring-shaped resinous member 3, synthetic rubber such as urethane rubber, silicone rubber, butadiene rubber, propylene rubber; natural rubber such as latex rubber; and elastomers such as olefin elastomers (polyethylene elastomer, polypropylene elastomer); amide elastomers (polyamide elastomer); styrene elastomers (for example, styrene-butadiene-styrene copolymer, styrene-isoprene-styrene copolymer, styrene-ethylene butylene-styrene copolymer); urethane elastomers (polyurethane elastomer of polyester family, polyurethane elastomer of polyether family) may be used.

In the bolt 1 of this embodiment, the ring-shaped resinous member 3 does not cover the seat surface 73 of the seat surface-forming portion 72, but covers the annular side surface (tapered portion) 74 of the seat surface-forming portion 72, the annular side surface of the flange body portion 71, and an annular peripheral edge of the tapered portion 76 formed on the upper surface of the flange body portion 71. In the bolt 1 of this embodiment, as described above, the outer diameter (maximum outer diameter) of the seat surface-forming portion 72 is set smaller than the outer diameter of the flange body portion 71. Therefore a lower annular portion 33 of the ring-shaped resinous member 3 which contacts the annular side surface 74 of the seat surface-forming portion 72 is located below the flange body portion 71. Therefore the ring-shaped resinous member 3 does not cover the seat surface 73 of the seat surface-forming portion 72, but covers the annular side surface 74 of the seat surface-forming portion 72, the annular flat surface 75 of the flange body portion 71, the annular side surface of the flange body portion 71, and the annular peripheral edge of the upper surface of the flange body portion 71.

Therefore the flange body portion 71 is sandwiched between the lower annular portion 33 and an upper annular portion 34 covering the annular peripheral edge of the upper surface 76 of the flange body portion 71. Thereby the ring-shaped member 3 is prevented from being removed from the bolt body 2 when and after the bolt is mounted on the portion where the bolt is to be mounted. The lower annular portion 33 has a form of contacting the tapered portion 74 of the seat surface-forming portion 72. More specifically, the lower annular portion 33 is extended to the peripheral edge of the seat surface 73 and is thus wedge-shaped.

Figure 12:
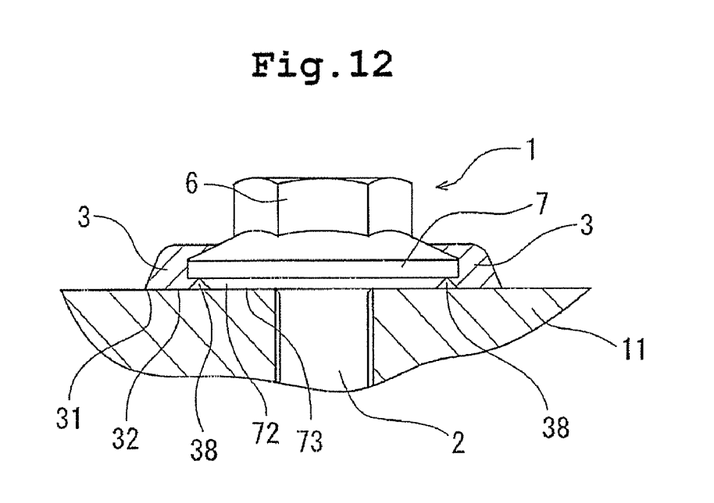
FIG. 12 is an explanatory view for explaining the action of the bolt of the present invention.

Because the annular skirt part 32 deforms when the bolt is mounted on the portion where the bolt is to be mounted, a contact surface of the lower annular portion 33 in contact with the annular flat surface 75 of the flange body portion 71 is stretched outward. Thus there is a possibility that the area of the contact surface decreases. As shown in FIG. 12, in mounting the bolt on the portion 11 where the bolt is to be mounted, the annular flat surface 75 is sandwiched under pressure between the portion 11 where the bolt is to be mounted and the flange part 7. Thus a liquid-tight state between the lower annular portion 33 of the annular skirt part 32 and the annular flat surface 75 of the flange body portion 71 is securely formed when the bolt of the present invention is mounted on the portion where the bolt is to be mounted.

In this embodiment, the ring-shaped resinous member 3 has the edge part 31 which is located at a position nearer to the lower end of the screw part 5 than the seat surface 73 and outward (in other words, outward from the peripheral edge of the flange body portion 3) from the flange body portion 3 and the annular skirt part 32 whose diameter increases toward the edge part 31. The unconductive ring-shaped resinous member 3 becomes gradually thinner to the edge part 31. Thereby in mounting the bolt on the portion where the bolt is to be mounted, the edge part is easily deformable. The annular skirt part 32 of the ring-shaped resinous member 3 deforms in mounting the bolt on the portion where the bolt is to be mounted, thus not preventing the seat surface 73 from being pressed against the portion where the bolt is to be mounted and forming the annular liquid-tight portion for the portion where the bolt is to be mounted. It is preferable that the diameter of the annular skirt part 32 becomes gradually larger to the edge part 31. In this embodiment, the annular skirt part 32 becomes taperingly larger to the edge part 31 in the diameter thereof.

A taper angle θ (FIG. 4) of the annular skirt part with respect to the axis of the screw part is favorably 60° to 89° and especially favorably to 65° to 86°. A projected length L (FIG. 4) of a distal end of the edge part 31 with respect to the seat surface 73 is favorably 0.05 mm to 1.5 mm and especially favorably 0.1 mm to 0.7 mm.

As shown in FIGS. 1 through 4, an inner edge of the annular skirt part 32 is coincident with an outer edge of the seat surface 73. Thus the annular skirt part 32 has a form that it is extended from the outer edge of the seat surface 73 to the edge part 31. The distal end of the edge part 31 forms a peripheral edge of the ring-shaped resinous member 3.

Figure 5:
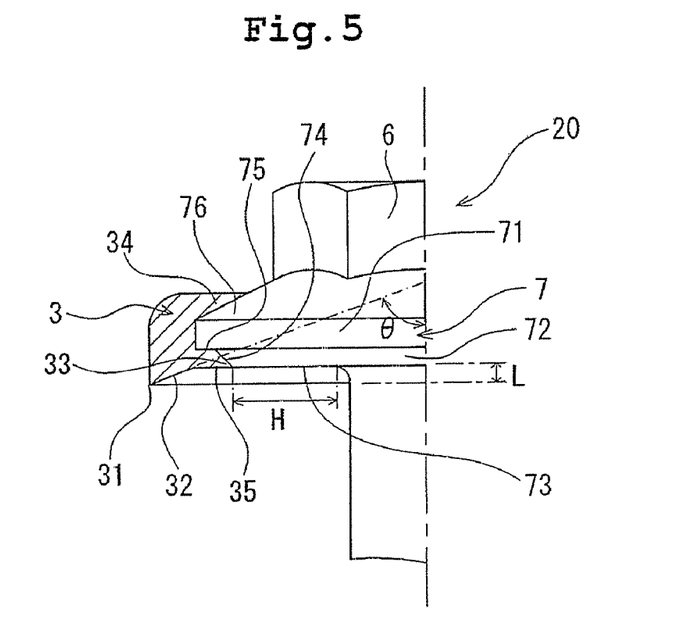
FIG. 5 is an explanatory view for explaining a bolt of another embodiment of the present invention.

The form of the ring-shaped resinous member 3 is not limited to the above-described one, but as with a bolt 20 shown in FIG. 5, as the form of the ring-shaped resinous member 3, the inner edge of the annular skirt part 32 may be positioned outward from the outer edge of the seat surface 73. In the bolt 20 of this embodiment, the lower annular portion 33 of the ring-shaped resinous member 3 has an annular flat surface 35 which does not project below the seat surface 73.

Figure 6:
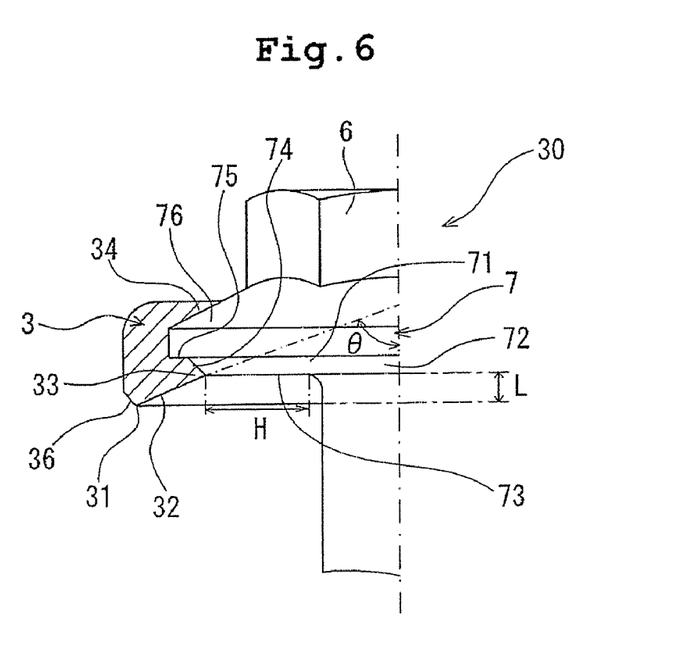
FIG. 6 is an explanatory view for explaining a bolt of still another embodiment of the present invention.

As with a bolt 30 shown in FIG. 6, as the form of the ring-shaped resinous member 3, the distal end of the edge part 31 forming the outer edge of the annular skirt part 32 may be positioned inward from the peripheral surface of the ring-shaped resinous member 3. The bolt 30 of this embodiment has an annular outer tapered surface 36 extended to the edge part 31. Therefore the inner side of the edge part 31 is constructed of the annular skirt part 32, whereas the outer side thereof is constructed of the annular outer tapered surface 36. Thus the edge part 31 forms a projected portion extended toward the lower side of the bolt.

Figure 7:
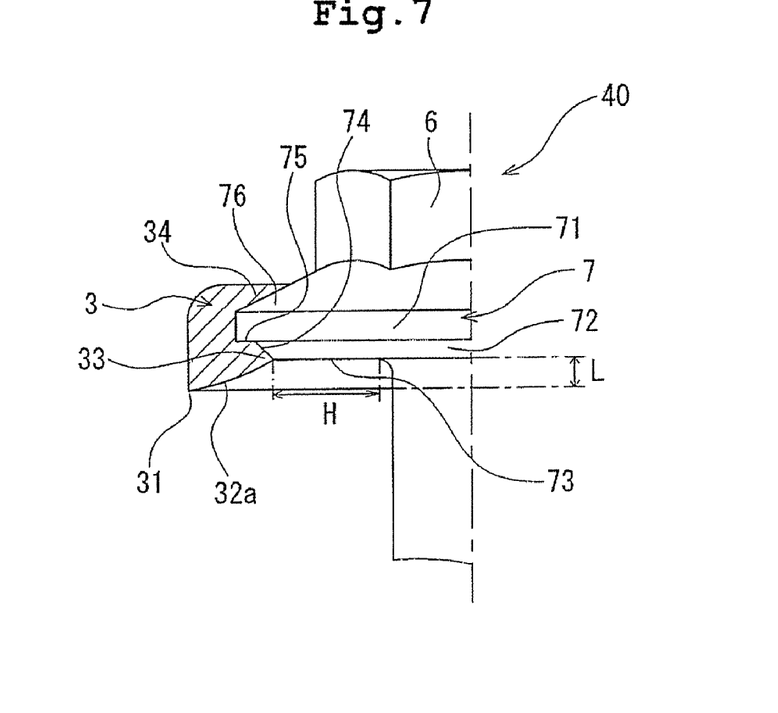
FIG. 7 is an explanatory view for explaining a bolt of still another embodiment of the present invention.
Figure 8:
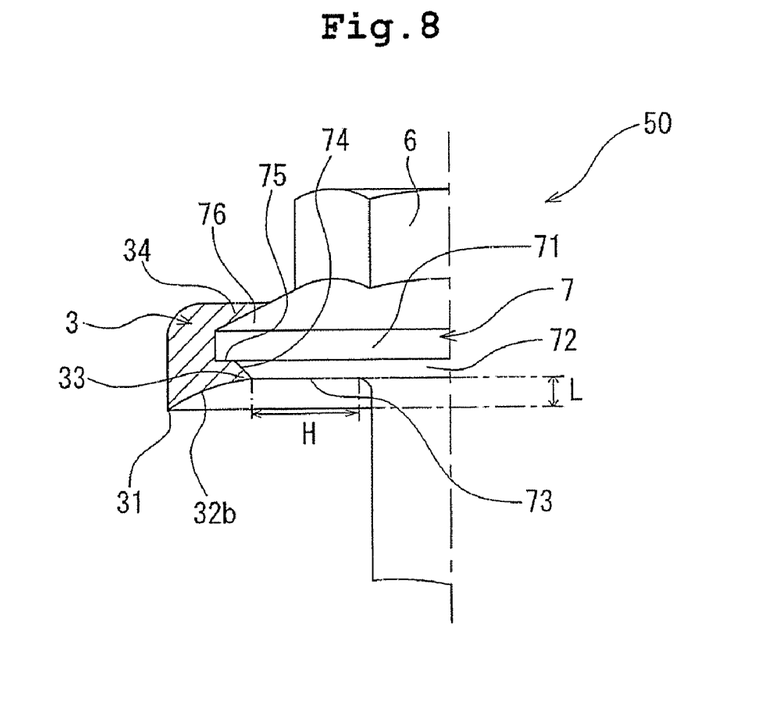
FIG. 8 is an explanatory view for explaining a bolt of still another embodiment of the present invention.

The form of the annular skirt part is not limited to the above-described tapered one, but as with a bolt 40 shown in FIG. 7, an annular skirt part 32a may be curvedly extended to the distal end of the edge part 31. In this example, the annular skirt part 32a is curved outward. Further as with a bolt 50 shown in FIG. 8, an annular skirt part 32b may be inwardly curved to the inside of the ring-shaped resinous member 3.

Figure 9:
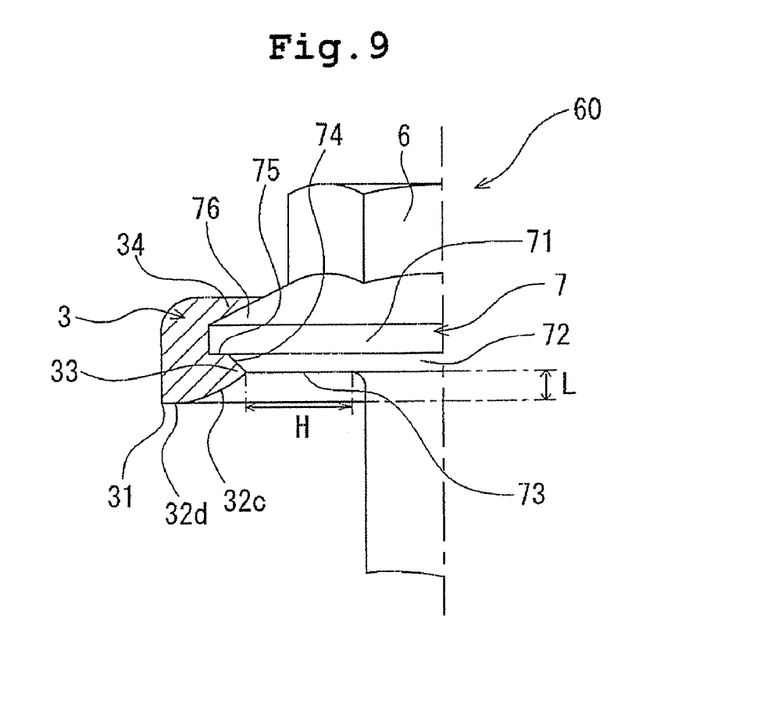
FIG. 9 is an explanatory view for explaining a bolt of still another embodiment of the present invention.

As with a bolt 60 shown in FIG. 9, an annular skirt part 32c may have a flat portion (almost parallel with seat surface) 32d formed in the vicinity of the edge part 31. In the bolt 60 shown in FIG. 9, the annular skirt part 32c has a curved portion bulged outward and the flat portion 32d extended from an end of the curved portion to the edge part.

Figure 10:
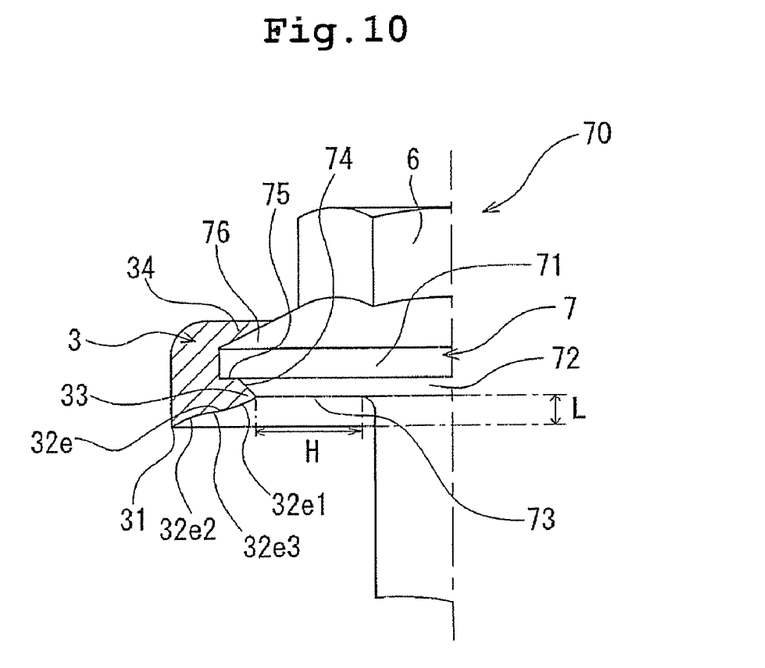
FIG. 10 is an explanatory view for explaining a bolt of still another embodiment of the present invention.

As with a bolt 70 shown in FIG. 10, an annular skirt part 32e may have an inner annular portion 32e1 having a curved surface bulged outward and an outer annular portion 32e2 inwardly curved a little. In this configuration, when the bolt is tightened, owing to deformation of the inner annular portion 32e1 bulged outward, it is possible to securely seal the gap between the lower annular portion 33 of the ring-shaped resinous member 3 and the annular flat surface 75 of the flange body portion 71 of the bolt body 2. Further owing to deformation of the outer annular portion 32e2 inwardly curved a little, it is possible to securely seal the gap between the peripheral edge of the ring-shaped resinous member 3 and a metal molded product which is an object where the bolt is to be fixed. Further as with the bolt 70 shown in FIG. 10, the bolt 70 may have a flat portion (almost parallel with seat surface) 32e3 disposed at a boundary between the inner annular portion 32e1 having the curved surface bulged outward and the outer annular portion 32e2 inwardly curved a little.

Figure 11:
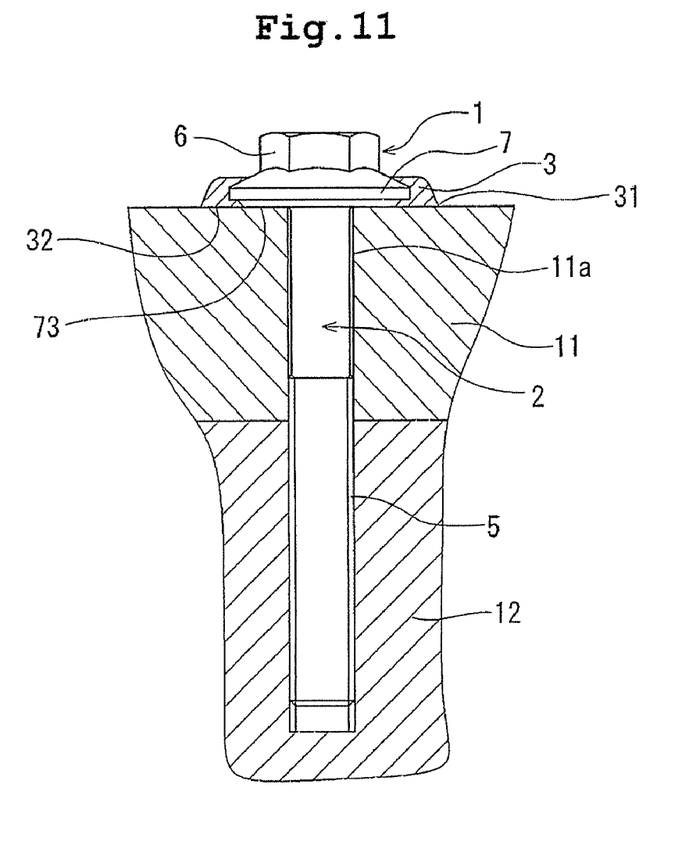
FIG. 11 is an explanatory view for explaining the action of the bolt of the present invention.

In the ring-shaped resinous member 3 of the bolt of the present invention, the annular skirt part 32 elastically deforms when the bolt is mounted on the portion where the bolt is to be mounted. Following the deformation of the annular skirt part 32, the ring-shaped resinous member 3 is pressed against the annular peripheral edge of the upper surface of the flange body portion. More specifically, as shown in FIGS. 11 and 12, when the bolt 1 of the present invention is mounted on the portion where the bolt 1 is to be mounted, the annular skirt part 32 of the ring-shaped resinous member 3 deforms outward. Following the deformation (affected by the deformation), the upper annular portion 34 of the ring-shaped member 3 deforms inward. Thereby the ring-shaped member 3 is pressed against the annular peripheral portion of the upper surface 76 of the flange body portion 71. Thus the liquid-tight property therebetween is improved. The above-described elastic deformation means deformation which displays a certain extent of a restoring force to the original configuration and does not mean a complete restoration to a configuration before the bolt is mounted on the portion where the bolt is to be mounted, when the bolt is removed therefrom.

As shown in FIG. 12, the ring-shaped resinous member 3 may be so constructed that it deforms in mounting the bolt on the portion 11 where the bolt is to be mounted and the annular skirt part 32 separates from the side surface of the seat surface-forming portion 72 (in other words, the lower annular portion 33 separates from the tapered portion 74). In this case, as shown in FIG. 12, the deformed ring-shaped resinous member 3 forms an annular space 38 between the side surface of the seat surface-forming portion 72 and the annular skirt part 32. By allowing the above-described separation to be accomplished, the annular skirt part 32 of the ring-shaped resinous member 3 is deformable more easily.

In the bolt of the present invention, when the bolt is mounted on the portion where the bolt is to be mounted, the bolt is capable of displaying its axial force with the seat surface thereof being pressed against the surface of the portion where the bolt is to be mounted, and the annular skirt part of the unconductive ring-shaped member closely contacts the surface of the portion where the bolt is to be mounted, thereby preventing the penetration of water into the gap between the bolt and the portion where the bolt is to be mounted and preventing the electrolytic corrosion from being generated by the flow of electric current between the bolt and the portion where the bolt is to be mounted.

As shown in FIGS. 11 and 12, the bolt 1 of the present invention is mounted on the portion (for example, component parts of car) of a molded product, made of a metal such as magnesium or a magnesium alloy, which is liable to generate a potential difference between it and the material forming the bolt body.

In the example shown in FIG. 11, the portion where the bolt is to be mounted is constructed of the plate material 11 made of the magnesium or the magnesium alloy and a member 12 where the bolt is to be fixed.

The bolt 1 of the present invention is inserted into a through-hole 11a of the plate material 11 and engaged by a female screw of the member 12 where the bolt 1 is to be fixed. As the engagement therebetween progresses, the edge part 31 of the annular skirt part 32 of the ring-shaped resinous member 3 contacts the plate material 11. By further progressing the engagement therebetween, the annular skirt part 32 contacts the plate material 11 and deforms outward. A bolt-mounting work finishes when the seat surface 73 of the bolt 1 is pressed against the surface of the plate material 11 to obtain a state shown in FIG. 12.

The present invention is not limited to the above-described embodiments, but various modifications can be made without departing from the gist of the present invention. Although the above-described embodiments have been described by taking the case in which the bolt is used for the combination of the plate material and the member where the bolt is to be fixed as an example, the present invention is not limited to the example. Further the bolt of the present invention can be utilized for various parts in addition to the parts of a car.

Industrial Applicability

The bolt of the present invention has the following forms:

(1) The bolt has the unconductive ring-shaped resinous member. The ring-shaped member has an edge part which is located at a position nearer to a lower end of the screw part than the seat surface and outward from the flange body portion and an annular skirt part whose diameter gradually increases to the edge part; and the annular skirt part deforms when the bolt is mounted on the portion where the bolt is to be mounted and does not prevent the seat surface from being pressed against the portion where the bolt is to be mounted and forms an annular liquid-tight sealing portion for the portion where the bolt is to be mounted.

Therefore the bolt is capable of holding the axial force thereof through the seat surface thereof when the bolt is mounted on the metal molded product liable to cause the electrolytic corrosion and securely preventing a liquid from penetrating into the portion of the metal molded product where the bolt is mounted and the metal molded product from causing the electrolytic corrosion.

The embodiments of the bolt may have the constructions described below.

(2) In the bolt according to the above-described (1), the annular skirt part increases to the edge part in a diameter thereof taperingly or curvedly.

(3) In the bolt according to the above-described (1) or (2), the bolt body has an annular side surface formed by a side surface of the seat surface-forming portion; and an annular flat surface formed between an upper peripheral edge of the annular side surface and a peripheral edge of the lower surface of the flange body portion; and the ring-shaped resinous member does not cover the seat surface of the seat surface-forming portion, but covers the annular side surface of the seat surface-forming portion, the annular flat surface of the flange body portion, an annular side surface of the flange body portion, and an annular peripheral edge of the upper surface of the flange body portion.

(4) In the bolt according to any one of the above-described (1) through (3), the ring-shaped resinous member becomes gradually thinner to the edge part.

(5) In the bolt according to any one of the above-described (1) through (3), the annular skirt part has a flat portion formed in the neighborhood of the edge part.

(6) In the bolt according to any one of the above-described (1) through (4), the annular skirt part has an inner annular portion having a curved surface bulged outward and an outer annular portion inwardly curved a little.

(7) In the bolt according to any one of the above-described (1) through (6), the unconductive ring-shaped resinous member is formed on the bolt body by insert molding.

(8) In the bolt according to any one of the above-described (1) through (7), the annular skirt part elastically deforms when the bolt is mounted on the portion where the bolt is to be mounted; and following the deformation of the annular skirt part, the ring-shaped resinous member is pressed against the annular peripheral edge of the upper surface of the flange body portion.

(9) In the bolt according to any one of the above-described (1) through (8), the diameter of the annular skirt part becomes taperingly larger to the edge part in a diameter thereof; and a taper angle of the annular skirt part with respect to an axis of the screw part is 60° to 89°.

(10) In the bolt according to any one of the above-described (1) through (9), a projected length of a distal end of the edge part with respect to the seat surface is 0.05 mm to 1.5 mm.

(11) In the bolt according to any one of the above-described (1) through (10), the unconductive ring-shaped resinous member is made of an unconductive resin having a tensile break elongation not less than 15%.

The invention claimed is:

1. A bolt comprising a bolt body having a screw part, a head part formed at an upper end of said screw part, and a flange part formed at a lower end of said head part; and an unconductive ring-shaped resinous member covering a peripheral portion of said flange part;
    wherein said flange part has a disk-shaped flange body portion and a seat surface-forming portion having a seat surface which is extended toward said screw part from a lower surface of said flange body portion, said seat surface-forming portion has a smaller diameter than said flange body portion and is pressed against a portion where said bolt is to be mounted;
    said ring-shaped resinous member has an edge part which is located at a position nearer to a lower end of said screw part than said seat surface and outward from said flange body portion, an annular skirt part whose diameter gradually increases to said edge part, an upper annular portion, and a lower annular portion;
    said annular skirt part deforms outward when said bolt is mounted on said portion where said bolt is to be mounted and does not prevent said seat surface from being pressed against said portion where said bolt is to be mounted and forms an annular liquid-tight-sealing portion for said portion where said bolt is to be mounted;
    wherein said bolt body has an annular side surface formed by a side surface of said seat surface-forming portion;
    an annular flat surface formed between an upper peripheral edge of said annular side surface and a peripheral edge of said lower surface of said flange body portion;
    said annular side surface of said seat surface-forming portion possessing an outer diameter tapering from an outer diameter at said flange part to a smaller outer diameter at said seat surface;
    said ring-shaped resinous member does not cover said seat surface of said seat surface-forming portion, but covers said annular side surface of said seat surface-forming portion, said annular flat surface of said flange body portion, an annular side surface of said flange body portion, and an annular peripheral edge of an upper surface of said flange body portion;
    said upper annular portion of said ring-shaped resinous member covering said annular peripheral edge of said upper surface of said flange body portion;
    said lower annular portion of said ring-shaped resinous member contacting said annular side surface of said seat surface-forming portion and extending to a peripheral edge of said seat surface, forming a wedge-shaped portion; and
    wherein said ring-shaped resinous member is formed on said bolt body by insert molding.

2. A bolt according to claim 1, wherein said annular skirt part increases to said edge part in a diameter thereof taperingly or curvedly.

3. A bolt according to claim 1, wherein said ring-shaped resinous member becomes gradually thinner to said edge part.

4. A bolt according to claim 1, wherein said annular skirt part has a flat portion formed in the neighborhood of said edge part.

5. A bolt according to claim 1, wherein said annular skirt part has an inner annular portion having a curved surface bulged outward and an outer annular portion inwardly curved a little.

6. A bolt according to claim 1, wherein said annular skirt part elastically deforms when said bolt is mounted on said portion where said bolt is to be mounted; and following said deformation of said annular skirt part, said ring-shaped resinous member is pressed against said annular peripheral edge of said upper surface of said flange body portion.

7. A bolt according to claim 1, wherein said annular skirt part becomes taperingly larger to said edge part in a diameter thereof; and a taper angle of said annular skirt part with respect to an axis of said screw part is 60° to 89°.

8. A bolt according to claim 1, wherein a project length L of a distal end of said edge part with respect to said seat surface is 0.05 mm to 1.5 mm.

9. A bolt according to claim 1, wherein said unconductive ring-shaped resinous member is made of an unconductive resin having a tensile break elongation not less than 15%.

10. A bolt according to claim 1, wherein a diameter of said annular skirt part increases to said edge part in a tapering or curved manner.

11. A bolt according to claim 1, wherein said annular skirt part increases to said edge part in a tapering or curved manner, and said annular skirt part has a flat portion formed in the neighborhood of said edge part.

12. A bolt according to claim 1, wherein said annular skirt part increase to said edge part in a tapering or curved manner, and said annular skirt part has an inner annular portion having a curved surface bulged outward and an outer annular portion inwardly curved a little.

13. A bolt according to claim 1, wherein said annular skirt part increases to said edge part in a tapering or curved manner, and said ring-shaped resinous member is pressed against said annular peripheral edge of said upper surface of said flange body portion.

14. A bolt according to claim 1, wherein said bolt body is made of an iron-based steel material and said bolt is mounted on the portion of a molded product made of magnesium or a magnesium alloy.

15. A bolt according to claim 1, wherein said annular skirt part deforms outward when said bolt is mounted on said portion, and said upper annular portion of said ring-shaped resinous member deforms inward due to the deformation of said annular skirt part.

16. A bolt according to claim 1, wherein said lower annular portion of said ring-shaped resinous member separates from said annular side surface of said seat surface-forming portion when said bolt is mounted on said portion so that an annular space exists between said side surface of the seat-surface-forming portion and said lower annular portion.

17. A bolt according to claim 1, wherein said ring-shaped resinous member has an annular outer tapered surface extending to said edge part, and said edge part is positioned inward from a peripheral surface of said ring-shaped resinous member.

18. A bolt comprising
a bolt body having a screw part, a head part formed at an upper end of the screw part, and a flange part formed at a lower end of the head part; and an unconductive ring-shaped resinous member covering a peripheral portion of the flange part,
wherein the flange part has a disk-shaped flange body portion and a seat surface-forming portion having a seat surface which is extended toward the screw part from a lower surface of the flange body portion, the seat surface-forming portion has a smaller diameter than the flange body portion and is pressed against a portion where the bolt is to be mounted;
the ring-shaped resinous member has an edge part which is located at a position nearer to a lower end of the screw part than the seat surface and outward from the flange body portion, an annular skirt part whose diameter gradually increases to the edge part, an upper annular portion, and a lower annular portion; and
the annular skirt part deforms outward when the bolt is mounted on the portion where the bolt is to be mounted- and forms an annular liquid-tight-sealing portion for the portion where the bolt is to be mounted,
wherein the bolt body has an annular side surface formed by a side surface of the seat surface-forming portion; and an annular flat surface formed between an upper peripheral edge of the annular side surface and a peripheral edge of the lower surface of the flange body portion;
the annular side surface of the seat surface-forming portion being a tapering annular side surface possessing an outer diameter tapering from a diameter at the flange part to a smaller diameter at the seat surface;
the ring-shaped resinous member covers the annular side surface of the seat surface-forming portion, the annular flat surface of the flange body portion, an annular side surface of the flange body portion, and an annular peripheral edge of an upper surface of the flange body portion;
the upper annular portion of the ring-shaped resinous member covering the annular peripheral edge of the upper surface of the flange body portion;
the upper annular portion of the ring-shaped resinous material deforming inward when the bolt is mounted on the portion where the bolt is to be mounted;
the lower annular portion of the ring-shaped resinous member contacting the tapering annular side surface of the seat surface-forming portion and extending to a peripheral edge of the seat surface, forming a wedge-shaped portion.

* * * * *